United States Patent

Timari

[11] Patent Number: 5,904,229
[45] Date of Patent: May 18, 1999

[54] BRAKE ASSEMBLY

[75] Inventor: Jali Timari, Pirkkala, Finland

[73] Assignee: Oy Scaninter Nokia Ltd., Tampere, Finland

[21] Appl. No.: 08/809,191

[22] PCT Filed: Sep. 20, 1994

[86] PCT No.: PCT/FI94/00416

§ 371 Date: Mar. 17, 1997

§ 102(e) Date: Mar. 17, 1997

[87] PCT Pub. No.: WO96/09241

PCT Pub. Date: Mar. 28, 1996

[51] Int. Cl.[6] .............................. B60T 8/72; B66B 1/02; B66B 5/04
[52] U.S. Cl. .................. 188/187; 188/184; 188/82.74; 188/82.77; 187/305; 187/373
[58] Field of Search .................... 188/184, 187, 188/82.2, 82.3, 82.34, 82.7, 82.74, 82.77, 82.8, 82.9, 180; 187/305, 373

[56] References Cited

U.S. PATENT DOCUMENTS 4,257,494  3/1981  Frankel .
4,856,623  8/1989  Ronig, Jr. ................................. 188/187
5,141,085  8/1992  McCormick ............................ 188/187
5,222,578  6/1993  Thorp .
5,287,950  2/1994  Feathers et al. ........................ 188/187

FOREIGN PATENT DOCUMENTS 92996  10/1994  Finland .

*Primary Examiner*—Chris Schwartz
*Attorney, Agent, or Firm*—Larson & Taylor

[57] ABSTRACT

A brake assembly by means of which rotational motion and also linear motion, i.e. faulty motion of lifting platforms, especially dropping, is braked. The assembly comprises a braking gear (20, 21) fitted onto axle (4), a coupling (25, 26) to transmit rotational motion and furnished with a locking device (27) that releases by an adjusted rate of centrifugal force generated by the rotational motion and locks the coupling to transmit rotational motion between the axle and the locking device. Upon locking, the locking device in the coupling is fitted to transmit rotational motion also in the opposite direction of the direction produced by the locking device in order to open the locking device by turning axle (4) in the opposite direction, and the coupling has a retaining shoulder (50) to prevent the locking device from returning immediately to an unlocked position when the brake is opened by rotating axle (4) in the opposite direction.

7 Claims, 4 Drawing Sheets

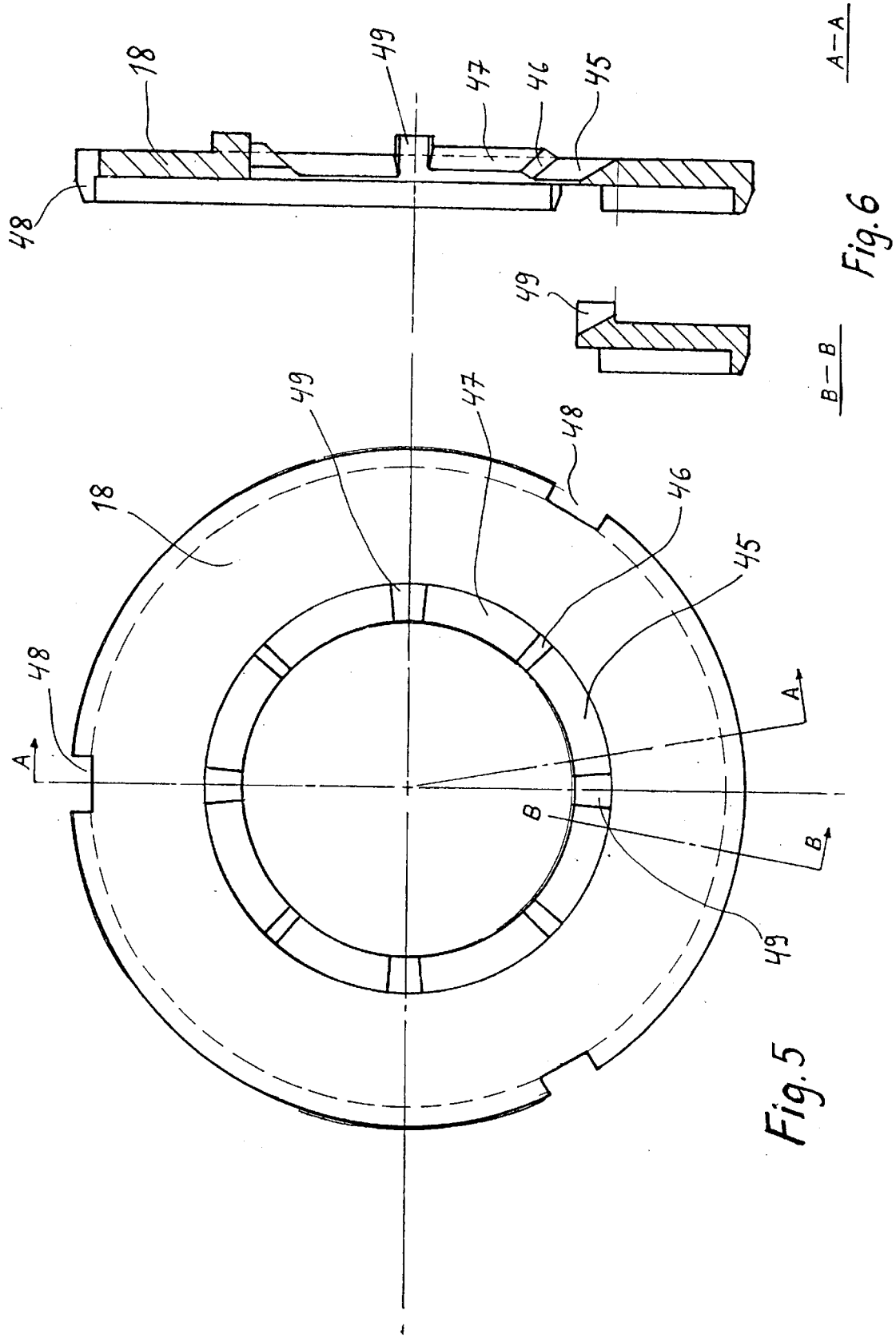

BRAKE ASSEMBLY

BACKGROUND OF THE INVENTION

1. Field of the Invention

The invention relates to a brake assembly which is used as an automatically activated emergency brake for among other things lifting platforms and elevators.

2. Description of the Prior Art

Automatically activated emergency brakes are previously known, for instance, from publications SE-302675 and 308785 illustrating the brake constructions, which, in case of emergency, brake and stop motion because of a speed higher than a set speed. The disadvantage of these known constructions is the very complicated disassembly of the locking system. In lifting platforms and elevators the brake is always locked. After an emergency stop the platform or elevator may be very high up. Disassembly of the brake locking system is accomplished by opening the brake gear, which means getting into an-uncontrollable state, where the elevator or lifting platform is not locked in position by any other means. If the fault is in the driving motor or its axles, the driving motor has no retaining capacity and so an emergency situation arises when the brake is being disassembled. In any case, the disassembly of the locking of these designs is a time-consuming and risky procedure as well as a hazardous job. Even checking the working order of these emergency brakes requires a braking test, after which the brake locking must also be disassembled by opening it with a tool.

By means of the brake assembly according to this invention these disadvantages are avoided.

SUMMARY OF THE INVENTION

A brake assembly for braking or stopping uncontrolled motion, by means of which rotational motion and also linear motion, of lifting platforms or similar vertically moving lifting housings is braked, wherein the linear motion is first turned into rotational motion by power transmission means. The brake assembly includes a housing fixed in a hoist gear so that the rotational motion, which is to be braked, is transmitted from the hoist gear to an axle of the brake assembly. A coupling is fitted on said axle for transmitting rotational motion to a braking gear, said coupling being comprised of a locking device, which is released by an adjusted rate of centrifugal force provided by rotational motion, by means of which locking device the coupling is locked to transmit rotational motion between the axle and the braking gear. The locking device is, when locked, fitted to transmit rotational motion in the opposite direction with respect to the direction of locking, in order to open the locking device by turning the axle in the opposite direction. The coupling includes a retaining shoulder to prevent the locking, device from returning immediately into an unlocked position when the brake is being released by counterwise rotation of the axle. The braking gear locks the rotational motion of the axle with regard to the assembly housing. The improvement comprising that the rotational motion over the coupling is, in an initial stage of braking, arranged to tighten the braking gear by an axial spring tensioning motion produced by a mutually stepped pair of counter surfaces formed in a sleeve attached to the coupling and a support flange is fitted with the sleeve such that rotation of the sleeve transmits a sudden axial motion to support flange to tighten the spring. In an initial stage of releasing the brake the rotational motion over the coupling is arranged to loosen the braking gear by an axial spring tension reducing motion produced by the mutually stepped pair of counter surfaces of the support flange and sleeve.

The most important advantage of this invention is that the brake locking can be opened simply by lifting the platform or elevator, i. e. in turning the brake assembly axle in the opposite direction. If the lifting motor and transmission of the lifting platform or similar equipment is in good working order, the brake can be opened safely and successfully without even touching the brake gear. Thus brake testing is an easy job. The brake opens automatically during the reverse rotation of the axle and is constantly ready for emergency braking.

A significant advantage of the brake assembly of the invention is that releasing the brake locked without disassembling the brake can be successfully carried out with a hoisting gear which is in good condition. This means that, firstly, the hoisting gear is checked or repaired and possible faults corrected, which faults may have also caused the uncontrolled dropping.

BRIEF DESCRIPTION OF THE DRAWINGS

In the following the invention is presented in detail with reference to the enclosed drawings, where

FIG. 2 is a cross-section of the coupling where the coupling is locked on.

FIGS. 5 and 6 are a support flange arranged against the brake spring.

DETAILED DESCRIPTION OF THE PREFERRED EMBODIMENT

Figure 1:
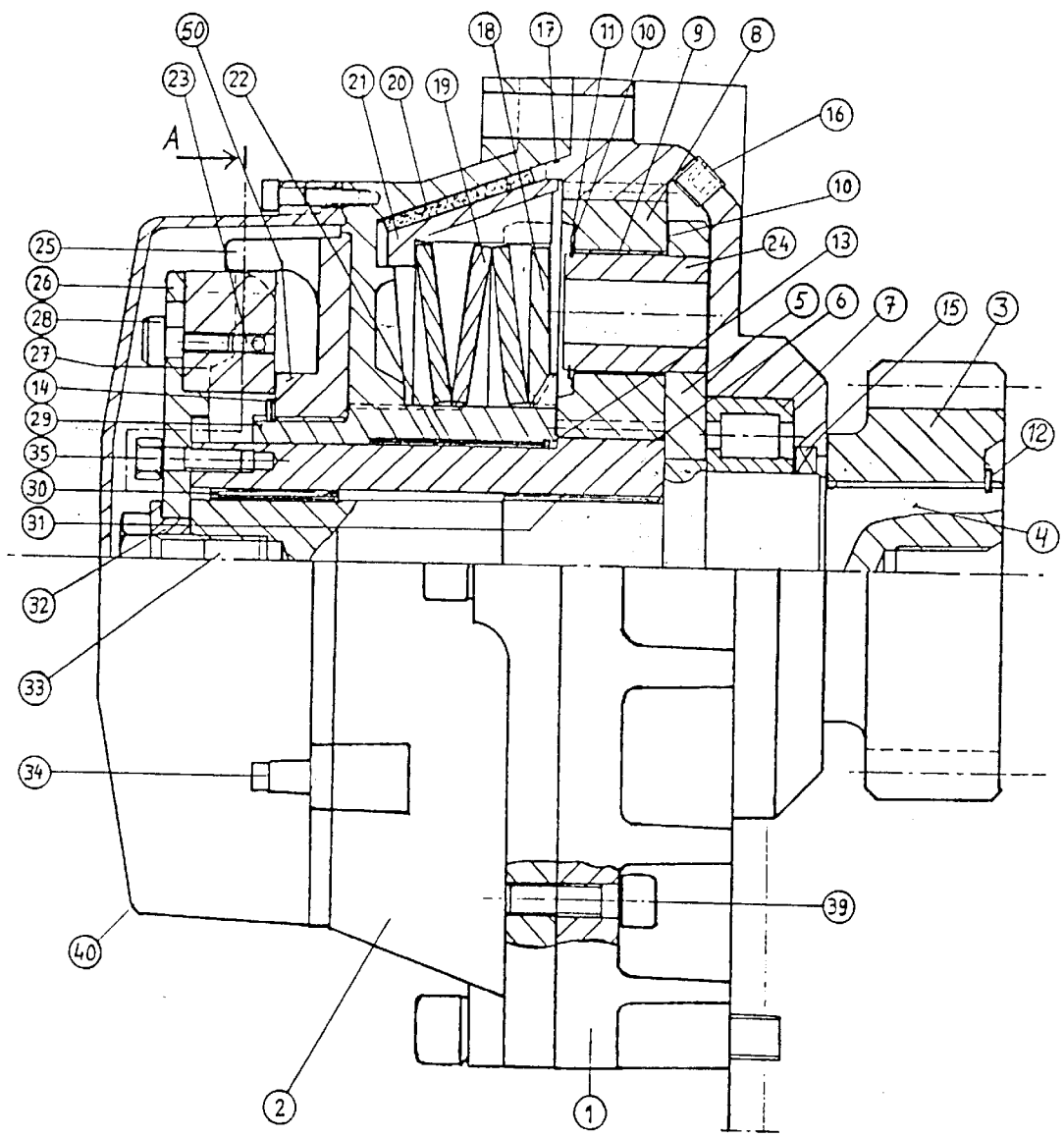
FIG. 1 is a longitudinal section of the brake assembly when the brake gear axle is free to rotate.

FIG. 1 shows a brake assembly according to the invention, to which rotational motion is transmitted by means of cog-wheel 3, for instance from a gear rack in the vertical support frame of the hoist device. Cog-wheel 3 is fixed to axle 4 by means of a slot joint and locked by locking ring 12. The brake assembly itself is fastened from its frame 1,2 to the movable lifting platform or elevator so that cog-wheel 3 remains in contact with the gear rack. Axle 4 is fastened with ball bearing 7 to housing 1. After the bearing a planetary gear 5,24,8 is fixed on axle 4, by means of which the rotational speed of sleeve 6 is tripled with regard to axle 4. As bearings of sleeve 6, sliding sleeves 30 and 31 are used. To the end of sleeve 6, one of the coupling counter flanges, for example locking flange 26, is fastened with screws 35, which includes a moving locking device 27. The other counter flange 25 of the coupling is furnished with firm claws. Coupling 22,26 is a claw flange coupling, the power transmitting claw 27 of which functions as a locking device. This locking device 27 is released by a spring force from its locked state to the space between flange 25 by a set rotation speed which is adjustable.

In FIG. 1 the coupling is open and rotational movement is not transmitted to coupling 25. Coupling 25 is on the rotation transmitting slot joint fastened to the end of sleeve 29. This sleeve 29 is fastened by sliding bearing 22 so that it rotates with respect to the sleeve inside it. The surface of sleeve 29 also has a thread 41 (FIG. 4) and a corresponding thread in housing 2. This means that whenever sleeve 29 is rotating, it also moves in line with the housing. To support cup springs 19 the end of this sleeve is fitted with a flange 18, which transmits, in association with the sleeve motions, spring tensioning or tension reducing forces. Cup springs 19 press conical brake surface 21 against the counterface in housing 2, which is furnished with friction surface 20.

The brake gear is progressive, because when the braking action is released by the locking device 27 of the coupling, the sleeve 29 and brake components 18, 20 and 21 start to rotate causing constant tightening of springs 19 until axle rotation stops due to a sufficient application of braking force.

Figure 2A:
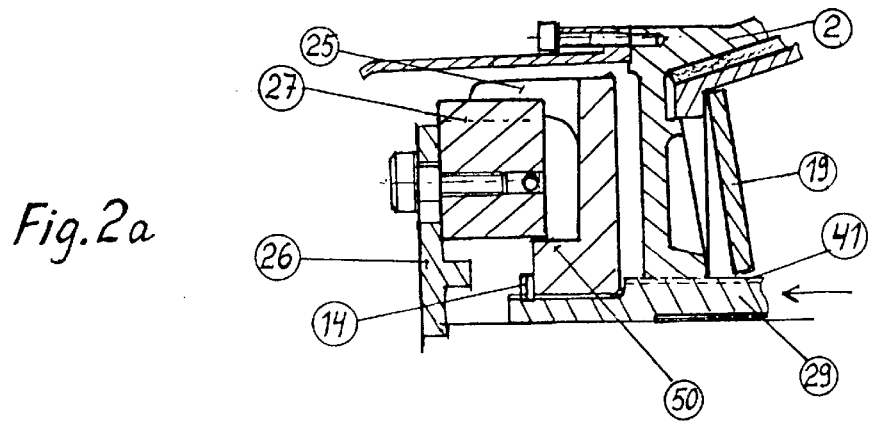
FIG. 2a is a cross-section showing how the coupling becomes locked.
Figure 2:
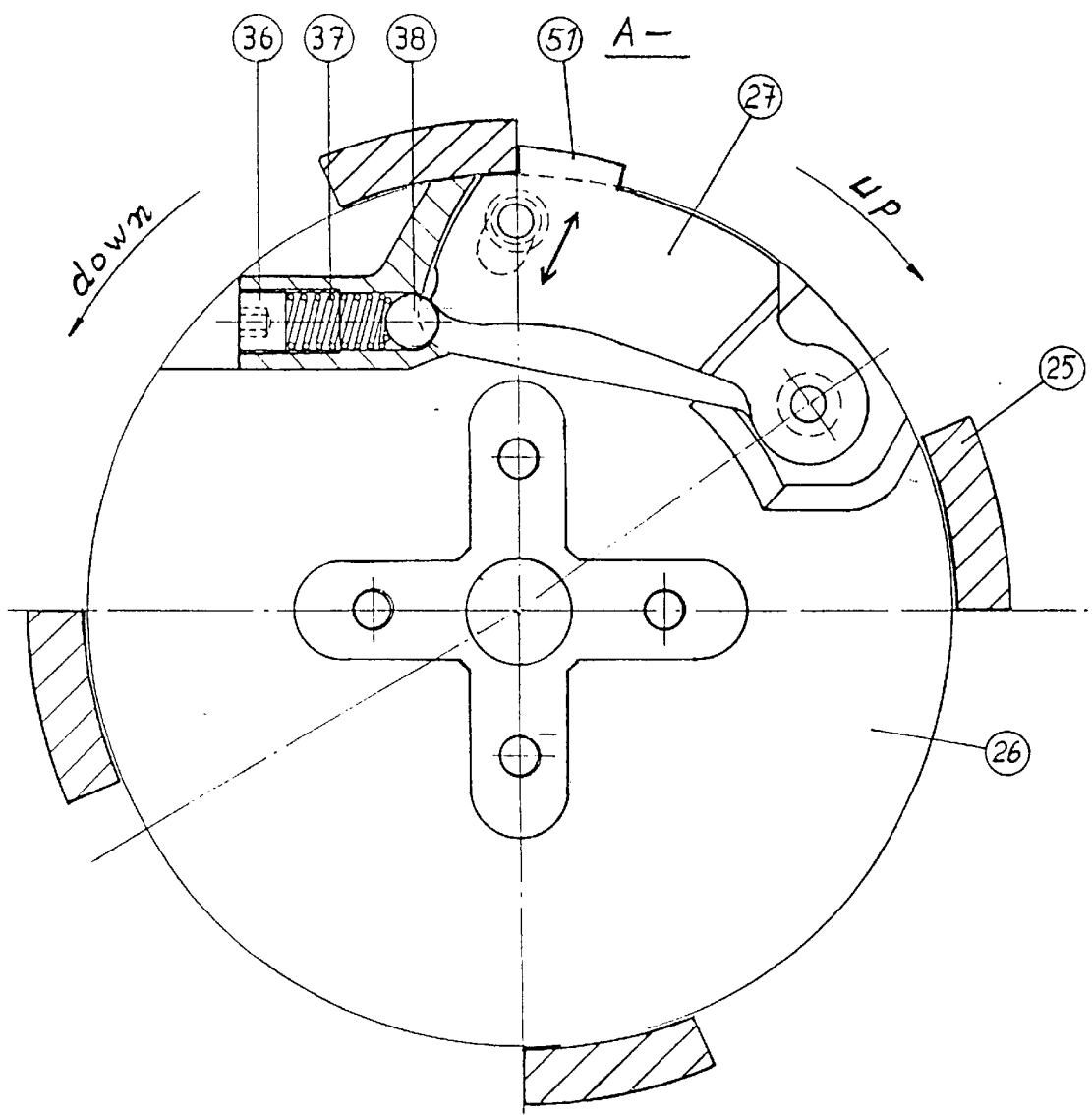

FIGS. 2a and 2 show what happens immediately when emergency braking is activated by locking device 27. Locking device 27 is turned outward by centrifugal force and bracket 51, which functions as a claw, hits the claw of the coupling counter flange 25 and causes flange 25 to rotate. Flange 25 then also rotates the sleeve 29, which due to thread 41 starts to move to the left in FIG. 2a. This makes shoulder 50 in coupling flange 25 start functioning as a clamp of the locking device 27 thus preventing the locking device from returning inward. Accordingly, the construction locks the coupling into the ON-position when emergency braking has been switched on. With axle 4 still in rotation, sleeve 29 moves to the left thus tensioning the brake springs 19 and raising the braking force. When axle 4 stops rotating, the brake and coupling remain locked on.

In the initial stage of emergency brake activation, the rotation of flange 25 is sensed by an electric switch, the impulse of which switches off the controlling current of the driving motor.

Releasing the locking device 27 is adjusted to a required speed of rotation by ball 38, spring 37 and adjusting screw 36. There is a cavity against which the ball is supported and enabled to keep the coupling open to a certain rate of centrifugal force.

Figure 3:
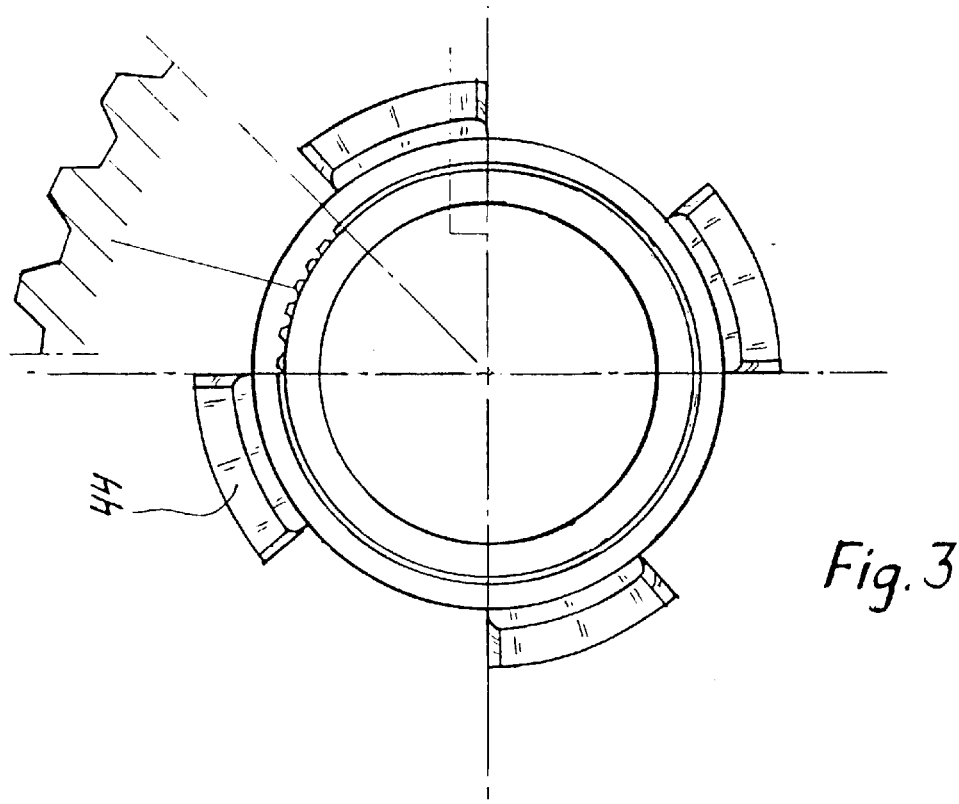
FIGS. 3 and 4 are a brake tightening sleeve.
Figure 4:
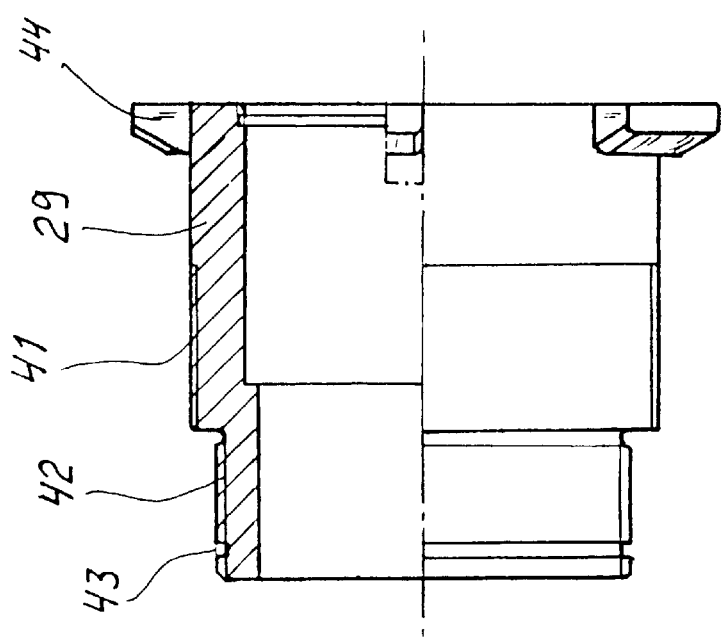

FIGS. 3 and 4 show sleeve 29, at the end of which there are slots for installing the coupling counter flange 25. In the approximate center of the sleeve there is a thread 4, for which there is a counter thread in housing 2. In the other sleeve end there are clawlike bevelled surfaces 44, the function of which is described in connection with FIGS. 5 and 6.

FIGS. 5 and 6 show flange 18 fixed to the end of sleeve 29 to support the cup springs and, at the same time, to transmit rotational motion from the sleeve to the brake surface. A most useful feature is associated with the power transmitting surface between flange 18 and sleeve 29. Claws 44 of sleeve 29 lean against surfaces 45 of flange 18 when the brake is in a neutral state, which means that axle 4 rotates freely. When the coupling is switched on by locking device 27 and sleeve 29 has started to rotate, the claws begin to slide onto surface 45 of flange 18 hitting the bevelled surface 46 and sliding onto the stepped surface 47. All this takes place when sleeve 29 is rotating only a few angular degrees. Due to the stepped difference between surfaces 45 and 47, flange 18 moves suddenly 3 or 4 mm. in the tensioning direction of springs 19 and an appropriate increase of tension is produced before the friction surface of the brake starts to slide. Anyhow, prior to this tensioning, the brake is already ON and springs 19 are tightening the brake surface to a degree that prevents the flange 18 from starting to rotate when the claws 44 of sleeve 29 rise over the bevelled surface 46 onto surface 47.

Flange 18 transmits the rotational motion from cavities 48 on its outer surface to the brake surface 21, which has brackets to fit in the corresponding cavities. Claws 44, slide onto surface 47, hit the stoppers 49 of flange 18, whereby the rotational motion of sleeve 29 is transmitted to flange 18 and brake surface 21. Then, when the braking force is constantly increasing while the sleeve is rotating, the motion of axle 4 is retarded by the increasing force and finally stopped. Braking remains ON in the locked position. The sliding surface between sleeve 29 and flange 18 is advantageous upon braking but upon releasing it is of much greater significance. Now, on starting to release the locked brake by turning axle 4, whereby the coupling and sleeve 29 are also turned but in the opposite direction, releasing of the brake proceeds as follows. The rotational force is transmitted in another direction by coupling 25,26 as per FIG. 2, whereby (in driving "up") the force is transmitted by bracket 51 to the coupling claw, now only to the adjacent claw shown in FIG. 2, whereat the coupling revolves slightly and transmission of the rotational motion begins. On turning axle 4 in the opposite direction, just the sliding surface 47 between sleeve 29 and flange 18 becomes the first sliding face from which claw 44 slides off to surface 45. This sliding does not require any great rotational force and takes place by means of the exemplary FIG. 5 construction at a range of ab, a ⅛ partial turn. Sliding of claw 44 to surface 45 immediately reduces the tension force of springs 19, since the flange can retreat at once about 3–4 mm. with respect to the sleeve. Sleeve 29 starts to rotate flange 18 due to stoppers 49. Now, after a significant drop of spring force, releasing of the brake proceeds so that even the brake surface 21 slides in the housing section 2 by means of its sliding surface 20. The driving motors of the lifting devices or elevators can easily perform this and releasing continues so that the braking force is constantly falling and sleeve 29 moves to the right in FIGS. 1 and 2a. When sleeve 29 is shifted so much to the right that the retaining shoulder 50 does not prevent locking device 27 from returning inwards, the locking device returns inwards as per FIG. 2, since the adjacent claw pushes the locking device in. In the brake releasing direction, i.e. upward directed motion, the location of the fixed hinge point of coupling flange 26 is in the direction of rotation before claw bracket 51, whereby claw 25 pushes bracket 51 inward and releases the locking device 27. Accordingly, the brake assembly returns to the state shown in FIG. 1, whereat axle 4 and, in addition, also locking flange 26 can rotate freely and by means of ball 38 the retaining capacity is set for the locking device 27.

Even though the brake assembly is presented by disclosing one embodiment only, several modifications are possible within the limits of the inventive concept described in the patent.

I claim:

1. A brake assembly for braking or stopping uncontrolled motion, by means of which rotational motion and linear motion, of lifting platforms or lifting housings is braked, wherein the linear motion is first turned into rotational motion by power transmission means, the brake assembly comprising a housing adapted to be fixed in a hoist gear so that the rotational motion, which is to be braked, is transmitted from the hoist gear to an axle of the brake assembly, a coupling fitted on said axle for transmitting rotational motion to a braking gear, said coupling being comprised of a locking device, which is released by an adjusted rate of centrifugal force provided by rotational motion, by means of which locking device the coupling is locked to transmit rotational motion between the axle and the braking gear, which locking device is, when locked, also fitted to transmit rotational motion in the opposite direction with respect to the direction of locking, in order to open the locking device by turning the axle in the opposite direction, and in that the coupling comprises a retaining shoulder to prevent the locking device from returning immediately into an unlocked position when the brake is being released by counterwise rotation of the axle, and the said braking gear locks the rotational motion of the axle with regard to the assembly housing, the improvement comprising that the rotational motion over the coupling is, in an initial stage of braking, arranged to tighten the braking gear by an axial spring tensioning motion produced by a mutually stepped pair of counter surfaces formed in a sleeve attached to the coupling and a support flange fitted with the sleeve such that rotation of the sleeve transmits a sudden axial motion to said support flange to tighten the spring and in an initial stage of releasing the brake the rotational motion over the coupling is arranged to loosen the braking gear by an axial spring tension reducing motion produced by the mutually stepped pair of counter surfaces of the support flange and sleeve.

2. A brake assembly according to claim 1 wherein when the axle is rotated and the braking effect essentially reduced, the retaining shoulder is arranged to leave its position that prevents the coupling from opening.

3. A brake assembly according to claim 1 wherein the brake tensioning and releasing motion is connected to cause movement of the retaining shoulder.

4. A brake assembly according to claim 1 wherein in a second braking stage the rotational motion over the coupling is arranged to tighten the braking gear by a thread formed in said sleeve, by means of which a spring tensioning axial motion is generated while the sleeve is turning in a counter thread in the housing.

5. A brake assembly according to claim 1 wherein in a second releasing stage the rotational motion over the coupling is arranged to release the brake by a thread formed in said sleeve, by means of which a motion that reduces spring tension is generated while the sleeve is turning in a counter thread in the housing.

6. A brake assembly according to claim 1 wherein in a second stage of releasing the brake when the retaining shoulder moves away from the locking device is dropping, the locking device is arranged to retreat from a counter surface in the coupling into an unlocked state.

7. A brake assembly according to claim 1 wherein a ball-spring construction is associated with the locking device, is turned into a regulating element, whereby a retaining capacity of the locking device can be influenced by adjusting the spring tension by means of the ball.

* * * * *